United States Patent
Liu et al.

(10) Patent No.: US 11,924,649 B2
(45) Date of Patent: Mar. 5, 2024

(54) METHOD TO MODULATE SIGNALS BY REFLECTING SURFACES

(71) Applicant: ZTE Corporation, Shenzhen (CN)

(72) Inventors: Ruiqi Liu, Shenzhen (CN); Yajun Zhao, Shenzhen (CN); Mengnan Jian, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/901,313

(22) Filed: Sep. 1, 2022

(65) Prior Publication Data

US 2023/0074103 A1   Mar. 9, 2023

Related U.S. Application Data

(63) Continuation of application No. PCT/CN2020/077563, filed on Mar. 3, 2020.

(51) Int. Cl.
*H04B 7/145* (2006.01)
*H01Q 3/44* (2006.01)
*H04W 16/28* (2009.01)

(52) U.S. Cl.
CPC ............ *H04W 16/28* (2013.01); *H04B 7/145* (2013.01); *H01Q 3/44* (2013.01)

(58) Field of Classification Search
CPC .......... H01Q 3/44; H04W 16/28; H04B 7/145
See application file for complete search history.

(56) References Cited

FOREIGN PATENT DOCUMENTS

| | | |
|---|---|---|
| CN | 107528787 A | 12/2017 |
| CN | 110266352 A | 9/2019 |
| CN | 110278017 A | 9/2019 |
| CN | 110830097 A | 2/2020 |
| CN | 110839204 A | 2/2020 |
| FR | 2965430 A1 | 3/2012 |
| WO | WO 2018/175151 A1 | 9/2018 |
| WO | WO 2018/175151 A1 | 9/2019 |

OTHER PUBLICATIONS

Najafi, Marzieh, "Intelligent Reflecting Surfaces for Free Space Optical Communications", 2019 IEEE Global Communications Conference (GLOBECOM), Dec. 13, 2019 (38 pages).
International Search Report and Written Opinion for International Application No. PCT/CN2020/077563 dated Dec. 4, 2020 (8 pages).
Chinese Office action for corresponding Application No. 202080098061.X dated Jul. 15, 2023 (20 pages).

(Continued)

*Primary Examiner* — Blane J Jackson
(74) *Attorney, Agent, or Firm* — Crowell & Moring LLP

(57) ABSTRACT

This document generally relates to use of intelligent reflecting devices in wireless communication systems, which may increase the coverage for a wireless access node or base station. An intelligent reflecting device may configure its surface with a degree of reflection according to a reflection scheme, and in turn, the surface may reflect an incident signal according to the reflection scheme. As a result, the reflected signal may have one or more characteristics that indicate to a receiving device that the received signal was reflected by an intelligent reflecting device, and/or one or more characteristics of the intelligent reflecting device.

17 Claims, 6 Drawing Sheets

(56) References Cited

OTHER PUBLICATIONS

Extended European Search Report for corresponding Application No. 20897203.4 dated Oct. 9, 2023 (9 pages).
Guo, "Reflecting Modulation", IEEE, Dec. 18, 2019, (31 pages).
Yang, IRS-Enhanced OFDMA: Joint Resource Allocation and Passive Beamforming Optimization, IEEE, Jun. 2020 (5 pages).
Yang, "IRS-Enhanced OFDM: Power Allocation and Passive Array Optimization" IEEE, Aug. 8, 2019 (6 pages).
Zheng, "Intelligent Reflecting Surface-Enhanced OFDM: Channel Estimation and Reflection Optimization", IEEE, Jan. 29, 2020, (5 pages).

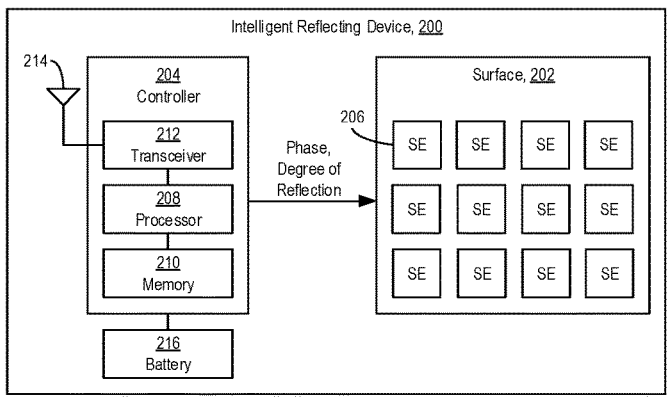
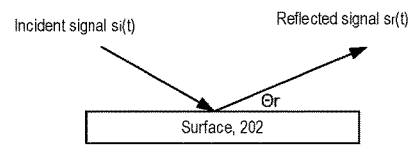
FIG. 2A
FIG. 2B
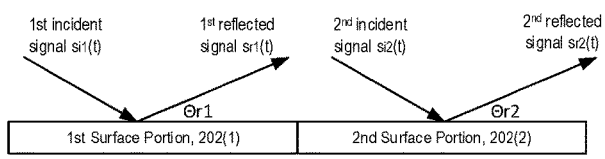
FIG. 2C

METHOD TO MODULATE SIGNALS BY REFLECTING SURFACES

CROSS-REFERENCE TO RELATED APPLICATIONS

This application is a continuation of International Application No. PCT/CN2020/077563, filed Mar. 3, 2020. The contents of International Application No. PCT/CN2020/077563 are herein incorporated by reference in their entirety.

TECHNICAL FIELD

This document is directed generally to intelligent reflecting devices in wireless communications.

BACKGROUND

Historically, next generations of wireless communications have utilized higher frequency bands than their predecessors. For example, 4G uses higher frequencies than 3G, and 5G uses higher frequencies than 4G. This trend will likely continue for future generations. However, signals communicated at higher frequencies have higher propagation loss. As such, ways to increase coverage that offset propagation loss in wireless communications, especially those that minimize power consumption, may be desirable.

SUMMARY

This document relates to methods, systems, apparatuses and devices for use of intelligent reflecting devices in wireless communications.

In some implementations, a method is disclosed. The method may include: setting associated degrees of reflection for a plurality of surface elements of a surface of an intelligent reflecting device according to a reflection scheme, wherein the surface is configured to reflect with one or more reflection angles; and with the surface, reflecting an incident signal with the associated degrees of reflection for the plurality of surface elements set according to the reflection scheme.

In some other implementations, a system including at least one intelligent reflecting device is disclosed. Each of the at least one intelligent reflecting device includes a controller and a surface that comprises a plurality of network elements, where the system is configured to implement the above method.

In some other implementations, a computer program product is disclosed. The computer program product may include a non-transitory computer-readable program medium with computer code stored thereupon, the computer code, when executed by one or more processors, causing the one or more processors to implement the method recited the above method with at least one intelligent reflecting device.

In some other implementations, another method is disclosed. The method may include: determining, with a controlling device, a schedule indicating a first time at which to transmit a first signal and a second time at which to transmit a second signal, the first signal determined to be reflected by a first intelligent reflecting device in a first propagation path, the second signal determined to be reflected by a second intelligent reflecting device in a second propagation path; and transmitting, with at least one sending device, the first signal and the second signal according to the schedule.

In some other implementations, another method is disclosed. The method may include: receiving, with a receiving device, a signal from a sending device; detecting, with the receiving device, that the signal was reflected by an intelligent reflecting device; and setting, with a controlling device, a reflection angle of the intelligent reflecting device dependent on detecting that the signal was reflected by the intelligent reflecting device.

In some other implementations, another method is disclosed. The method may include: transmitting, with a sending device, a first signal to a receiving device; receiving, with the sending device, a second signal indicating whether the first signal was reflected by an intelligent reflecting device prior to receipt by the receiving device; and determining, with a controlling device, whether to control a reflection angle of the intelligent reflecting device, the determining dependent on whether the second signal was reflected by the intelligent reflecting device.

In some other implementations, a system including one or more network devices is disclosed. The one or more network devices may include one or more processors and one or more memories, wherein the one or more processors are configured to read computer code from the one or more memories to implement any one of the methods above.

In yet some other implementations, a computer program product is disclosed. The computer program product may include a non-transitory computer-readable program medium with computer code stored thereupon, the computer code, when executed by one or more processors, causes the one or more processors to implement any one of the methods above.

The above and other aspects and their implementations are described in greater detail in the drawings, the descriptions, and the claims.

BRIEF DESCRIPTION OF THE DRAWINGS

FIG. 2A shows a block diagram of an example intelligent reflecting device.

FIG. 2B shows a diagram of a surface of an intelligent reflecting device reflecting an incident signal.

FIG. 2C shows a diagram of a surface reflecting with multiple reflection angles.

DETAILED DESCRIPTION

The present description describes wireless communications involving one or more intelligent reflecting devices. An intelligent reflecting device may configure its surface with a degree of reflection according to, or dependent on, a reflection scheme, and in turn, the surface may reflect an incident signal according to the reflection scheme. As a result, the reflected signal may have one or more characteristics that indicate to a receiving device that the received signal was reflected by an intelligent reflecting device, and/or one or more characteristics of the intelligent reflecting device. In turn, upon receipt of the received signal, the receiving device may detect whether the received signal was reflected by an intelligent device, and/or one or more characteristics of the intelligent reflecting device. Upon detection, the receiving device may send signals to a sending device to inform it of the result of the detection. Upon detection, one or more devices (such as the receiving device, the sending device with which the receiving device is communicating, or another device) may control the intelligent reflecting device, such as by controlling a reflection angle of the reflection device, and/or by configuring the intelligent reflecting device with an optimal reflection angle while it reflects signals communicated between the receiving and sending devices.

Inclusion of intelligent reflecting devices in propagation paths between sending and receiving devices may desirably increase coverage in a wireless communication system due to their ability to reflect signals in certain desired or optimal directions. In addition, intelligent reflection devices may be desirable over other types of electronic devices that are also capable of increasing coverage, at least in that they are less complex and/or consume less power. For example, other devices that can increase coverage, such as relays, may include circuitry that receive, process, and transmit signals, such as receive and transmit circuit paths and demodulation/modulation circuits, which are more complex and consume more power compared to the surfaces of intelligent reflecting devices performing the reflection. Accordingly, inclusion of intelligent reflecting devices in wireless communication systems may be increasingly desirable as ways to increase coverage as communication frequencies, and resulting propagation losses, increase. In turn, configuring intelligent reflecting devices with certain reflection schemes as described herein may enhance control and usage of intelligent reflecting devices in wireless communication systems.

Figure 1:
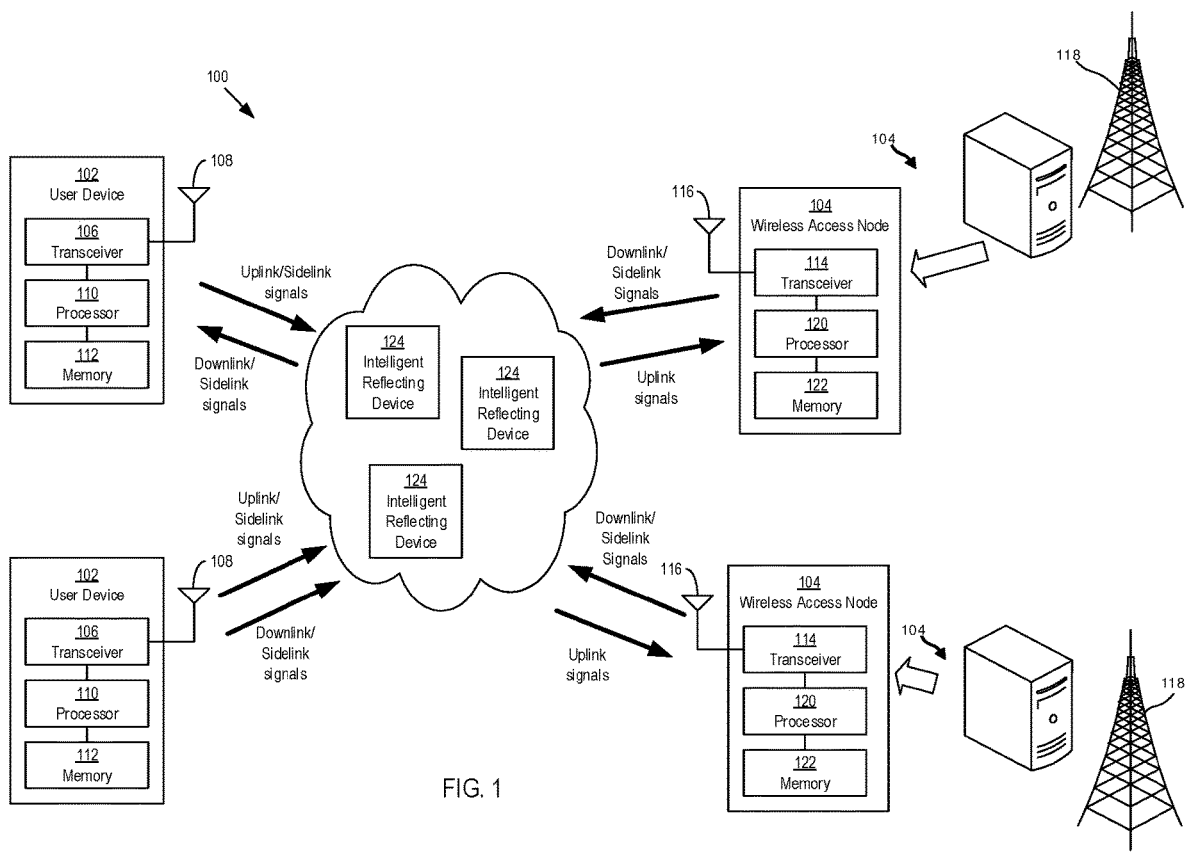
FIG. 1 shows a block diagram of an example of a wireless communication system.

FIG. 1 shows a diagram of an example wireless communication system 100 including a plurality of communication nodes that are configured to wirelessly communicate with each other. In general, the communication nodes include at least one user device 102 and at least one wireless access node 104. The example wireless communication system 100 in FIG. 1 is shown as including two user devices 102 and two wireless access nodes 104. However, various other examples of the wireless communication system 100 that include any of various combinations of user devices 102 and wireless access nodes 104, including only one user device 102 and only one wireless access node 104, only one user device 102 and two or more wireless access nodes 104, two or more user devices 102 without any wireless access nodes 104, two or more user devices 102 and one or more wireless access nodes 104, or two or more wireless access nodes 104 without any user devices 102.

The user device 102 may include a single electronic device or apparatus, or multiple (e.g., a network of) electronic devices or apparatuses, capable of communicating wirelessly over a network. A user device may comprise or otherwise be referred to as a user terminal or a user equipment (UE). Additionally, a user device may be or include, but not limited to, a mobile device (such as a mobile phone, a smart phone, a tablet, or a laptop computer, as non-limiting examples) or a fixed or stationary device, (such as a desktop computer or other computing devices that are not ordinarily moved for long periods of time, such as appliances, other relatively heavy devices including Internet of things (IoT), or computing devices used in commercial or industrial environments, as non-limiting examples). In various embodiments, a user device 102 may include transceiver circuitry 106 coupled to an antenna 108 to effect wireless communication with the wireless access node 104. The transceiver circuitry 106 may also be coupled to a processor 110, which may also be coupled to a memory 112 or other storage device. The memory 112 may store therein instructions or code that, when read and executed by the processor 110, cause the processor 110 to implement various ones of the methods described herein.

Similarly, a wireless access node 104 may also include a single electronic device or apparatus, or multiple (e.g., a network of) electronic devices or apparatuses, and may comprise one or more base stations or other wireless network access points capable of communicating wirelessly over a network with one or more user devices and/or with one or more other wireless access nodes 104. For example, the wireless access node 104 may comprise a 4G LTE base station, a 5G NR base station, a 5G central-unit base station, a 5G distributed-unit base station, a next generation Node B (gNB), an enhanced Node B (eNB), or other base station, in various embodiments. A wireless access node 104 may include transceiver circuitry 114 coupled to an antenna 116, which may include an antenna tower 118 in various approaches, to effect wireless communication with the user device 102 or another wireless access node 104. The transceiver circuitry 114 may also be coupled to one or more processors 120, which may also be coupled to a memory 122 or other storage device. The memory 122 may store therein instructions or code that, when read and executed by the processor 120, cause the processor 120 to implement various ones of the methods described herein.

In various embodiments, two communication nodes in the wireless system 100—such as a user device 102 and a wireless access node 104, two user devices 102 without a wireless access node 104, or two wireless access nodes 104 without a user device 102—may be configured to wirelessly communicate with each other in or over a mobile network and/or a wireless access network according to one or more standards and/or specifications. In general, the standards and/or specifications may define the rules or procedures under which the communication nodes can wirelessly communicate, which may include those for communicating in millimeter (mm)-Wave bands, and/or with multi-antenna schemes and beamforming functions. In addition or alternatively, the standards and/or specifications are those that define a radio access technology and/or a cellular technology, such as Fourth Generation (4G) Long Term Evolution (LTE), Fifth Generation (5G) New Radio (NR), or New Radio Unlicensed (NR-U), as non-limiting examples.

In the wireless system 100, the communication nodes are configured to wirelessly communicate signals between each other. In general, a communication in the wireless system 100 between two communication nodes can be or include a transmission or a reception, and is generally both simultaneously, depending on the perspective of a particular node in the communication. For example, for a given communication between a first node and a second node where the first node is transmitting a signal to the second node and the second node is receiving the signal from the first node, the first node may be referred to as a sending node or a sending device, the second node may be referred to as a receiving node or a receiving device, and the communication may be considered a transmission for the first node and a reception for the second node. Of course, since communication nodes in a wireless system 100 can both send and receive signals, a single communication node may be both a sending node/device and a receiving node/device simultaneously or switch between being a sending node/device and a receiving node/device.

Also, particular signals can be characterized or defined as either an uplink (UL) signal, a downlink (DL) signal, or a sidelink (SL) signal. An uplink signal is a signal transmitted from a user device 102 to a wireless access node 104. A downlink signal is a signal transmitted from a wireless access node 104 to a mobile station 102. A sidelink signal is a signal transmitted from a first user device 102 to a second user device 102, or a signal transmitted from a first wireless access node 104 to a second wireless access node 104.

In addition, the wireless communication system 100 may further include, or be in communication with, a network of one or more intelligent reflecting devices 124. As used herein, an intelligent reflecting device is a device having a surface that can reflect a signal, and that has a variable degree of reflection. An intelligent reflecting device, and/or the intelligent reflecting device's surface, may also, or otherwise, be referred to as an intelligent reflecting surface (IRS), a large intelligent surface (LIS), a large intelligent metasurface (LIM), smart reflect-arrays, a reconfigurable intelligent surface (RIS), a software-defined surface (SDS), a software-defined metasurface (SDM), a passive intelligent surface (PIS), or passive intelligent mirrors.

In general, a surface of an intelligent reflecting device receives an incident signal and reflects the incident signal. The signal that the surface outputs in response to, or as a result of the reflection is referred to as a reflected signal. In other words, a reflected signal is a reflected version of an incident signal reflected by a surface.

In addition, a surface of an intelligent reflecting device may be configured to reflect an incident signal with a degree of reflection. In general, a degree of reflection is or indicates an amount of power of the incident signal that the surface reflects. The degree of reflection may be a value in units of power (such as Watts), or may be represented as a percentage or a fraction of the power of the incident signal. A surface of the intelligent reflecting device can dynamically change its degree of reflection such that it is capable of having different degrees of reflection at different times.

A surface of an intelligent reflecting device has a variable degree of reflection by being configured to change between at least two degrees of reflection. For example, the surface may reflect with a maximum degree of reflection and a minimum degree of reflection. When a surface is reflecting with a maximum degree of reflection, the surface reflects as much power of the incident signal as it is capable of reflecting. In various embodiments, when a surface is reflecting with a maximum degree of reflection, the surface reflects all or substantially all of the power of the incident signal, such that the reflected signal has 100%, or substantially 100%, (e.g., a percentage slightly less than 100% resulting from unavoidable power loss, such as due to inherent properties of the surface, e.g., dielectric loss, metallic loss, or ohmic loss, as non-limiting examples) of the power of the incident signal. Also, when a surface is reflecting with a minimum degree of reflection, the surface absorbs as much power of the incident signal as it is capable of absorbing. In various embodiments, when a surface is reflecting with a minimum degree of reflection, the surface absorbs all or substantially all of the power of the incident signal, such that none, or substantially none, of the power of the incident signal is reflected.

In addition, in various embodiments, a surface of an intelligent reflecting device is configured to reflect an incident signal with one or more intermediate degrees of reflection in between maximum and minimum degrees of reflection. For example, a surface may be configured to output a reflected signal with any of various percentages in between 0% and 100% of the power of the incident signal, such as 25%, 50%, or 75%, as non-limiting examples. For such embodiments, a surface of an intelligent reflecting device may change from reflecting between a maximum degree of reflection and an intermediate degree of reflection, between a minimum degree of reflection and an intermediate degree of reflection, and/or between different intermediate degrees of reflection.

Also, the degree of reflection of the surface may be inversely related to a degree of absorption of the surface, which may be or indicate an amount of power of the incident signal that the surface absorbs. In general, power of an incident signal that a surface absorbs is power that the surface does not reflect. Accordingly, the higher a surface's degree of absorption, the lower its degree of reflection.

In further detail, FIG. 2A shows a block diagram of an example configuration of an intelligent reflecting device 200, which is representative of an example configuration of an intelligent reflecting device 124 in FIG. 1. The intelligent reflecting device 200 includes a surface 202 and a controller 204. The surface 202 includes a plurality of surface elements (SE) (also called surface units (SU)) 206. A surface element 206 is a portion of the surface 202 with an associated variable (or dynamically changeable) degree of reflection. Accordingly, degrees of reflection of different surface elements 206 of the same surface 202 can be independently controlled and/or changed, such that at any given point in time, the different surface elements 206 can have the same or different degrees of reflection. In turn, the surface 202, at a given point in time, may have an overall or combined degree of reflection that corresponds to, and/or that is based, on a combination of the degrees of reflection of the surface elements 206 of the surface 202 at that given point in time.

A surface element 206, as described herein, may have any of various configurations, and/or may be made of any of various materials, that enable it to have a variable and controllable degree of reflection. In addition, the controller 204 may be configured to control and/or change the degree of reflection of a surface element 206 in any of various ways, such as through output of one or more control signals and/or by changing an electrical bias, such as a voltage or a current, applied to the surface element 206, as non-limiting examples. Through its control, the controller 204 may, in turn, change a feature of the surface element 206, such as a material property and/or an electrical characteristic, upon which the surface element's degree of reflection depends. As a non-limiting example, a surface element 206 may be configured with a variable resistance, and a change in value of the variable resistance changes an amount of power that the surface element 206 absorbs, in turn changing the degree of reflection of the surface element 206. Accordingly, the controller 204 may correspondingly set the resistance value of the variable resistance in order to configure the surface element with a desired degree of reflection. Additionally, when the controller 204 wants to change the degree of reflection, it correspondingly changes the resistance value that yields the new desired degree of reflection. Ways other than, or in combination with, a variable resistance may be used to provide a surface element 206 with a variable degree of reflection.

The controller 204 may configure the surface 202 with, or to have, a maximum degree of reflection, a minimum degree of reflection, or an intermediate degree of reflection, at any given point in time during operation. To configure the surface 202 with the maximum degree of reflection, the controller 204 may control the surface elements 206 so that all of the surface elements 206 are configured to reflect with their respective maximum degrees of reflection. Similarly, to configure the surface 202 with the minimum degree of reflection, the controller 204 may control the surface elements 206 so that all of the surface elements 206 are configured to reflect with their respective minimum degrees of reflection.

In addition, to configure the surface 202 with an intermediate degree of reflection, the controller 204 may control the surface elements 206 such that at least one of the surface elements 206 is configured with an associated minimum or intermediate degree of reflection and less than all of the surface elements 206 are configured with their associated minimum degrees of reflection. Various ways of configuring the surface 202 with an intermediate degree of reflection may be possible, and may depend on the percentage of the intermediate degree of reflection, and the granularity of the degrees of reflection with which an individual surface element 206 may be configured. In general, when considered in combination, the surface elements 206 may have an average degree of reflection, which is an average of the individual degrees of reflection, and which may determine the degree of reflection of the surface 202. Accordingly, the controller 204 may configured a certain number of surface elements 206 with a maximum degree of reflection, a minimum degree of reflection, or certain intermediate degrees of reflection that, in turn, yield an average degree of reflection corresponding to a desired intermediate degree of reflection for the surface 202. As brief, non-limiting examples, to configure the surface 202 with an intermediate degree of reflection of 50%, the controller 204 may configure half of the surface elements 206 with a maximum degree of reflection and the other half of the surface elements 206 with a minimum degree of reflection, or may configure all of the surface elements 206 with respective 50% intermediate degrees of reflection, or may configure half of the surface elements 206 with respective 75% intermediate degrees of reflection and the other half with 25% intermediate degrees of reflection. Various ways of configuring the surface elements 206 with some combination of a maximum degree of reflection, a minimum degree of reflection, and one or more intermediate degrees of reflection, in order to achieve a desired average or overall intermediate degree of reflection for the surface 202 may be possible.

Referring back to FIG. 2A and also to FIG. 2B, a surface 202 of an intelligent reflecting device 200 may also have a variable angle of reflection (or reflection angle). To have a variable reflection angle, each surface element 206 may have an associated variable phase shift with which it reflects an incident signal $s_i(t)$ to output a reflected signal $s_r(t)$. In turn, the combination of the phase shifts of the individual surface elements 206 determines a reflection angle $\Theta_r$ at which the surface 202 outputs a reflected signal $s_r(t)$. Accordingly, changing one or more phase shifts changes the reflection angle $\Theta_r$. In this way, by setting and changing the phase shifts, the surface 202 performs beam forming by changing the reflection angle $\Theta_r$ in order to dynamically direct reflected signals in certain directions.

Additionally, in general, at any given point in time, a surface 202 of an intelligent reflecting device 200 is configured to reflect incident signals with one or more reflection angles. In some embodiments, as indicated in FIG. 2B, the surface 202 is configured to reflect with a single reflection angle, that is, with the same or a uniform reflection angle over the surface 202. In other example embodiments, a surface 202 of an intelligent reflecting device 200 is configured to reflect with multiple reflection angles at a given point in time. For example, a surface 202 may be separated or divided into multiple portions, with each portion including one or more surface elements. The controller 204 may control the different portions independently of each other so that each portion is configured to operate independent of each other and reflect with its own corresponding reflection angle.

FIG. 2C shows an example embodiment, where a surface 202 is separated or divided into two portions, including a first surface portions 202(1) and a second surface portion 202(2). The first portion 202(1) is configured to reflect a first incident signal $s_{i1}(t)$ to output a first reflected signal $s_{r1}(t)$ with a first reflection angle $\Theta_{r1}$, and the second portion 202(2) is configured to reflect a second incident signal $s_{i2}(t)$ to output a second reflected signal $s_{r2}(t)$ with a second reflection angle $\Theta_{r2}$. The controller 204 may control the phase shifts of the surface elements 206 of the individual portions 202(1), 202(2) so that their corresponding reflection angles $\Theta_{r1}$, $\Theta_{r2}$ are the same or different from each other at any given point in time. Other example embodiments of a surface of an intelligent reflecting device may include more than two portions such that the surface is configured to reflect with more than two reflection angles.

Referring particularly to FIG. 2A, the controller 204 is configured to control the surface 202 and surface elements 206. The controller 204 may control the surface 202 and the surface elements 206 by setting and/or changing the degree of reflection of the surface 202, including the degrees of reflection of the surface elements 206, and/or by setting and/or changing the angle of reflection of the surface 202, including the phase shifts of the surface elements 206. Similar to the communication nodes in FIG. 1, the controller 204 may include a processor 208 and a memory (or other storage device) 210. In various embodiments, the memory 210 may store therein instructions or code that, when read and executed by the processor 208, cause the processor 208 to implement various ones of the methods described herein. In addition or alternatively, the memory 210 may store one or more reflection schemes to control the surface 202 and the surface elements 206. Details of reflection schemes are described in further detail below.

Additionally, for at least some example configurations, the controller 204 includes transceiver circuitry 212 coupled to an antenna 214. The transceiver circuitry 212 may also be coupled to the processor 208 and/or to the memory 210. For at least some of these example configurations, and/or for other example configurations, the controller 204 includes one or more connectors configured to connect to electrical wires or cabling, which are also connected to other devices or communication nodes. Accordingly, in various embodiments, an intelligent reflecting device can externally communicate with one or more communication nodes, such as by transmitting and receiving signals, wirelessly, though wires, or a combination thereof.

In particular example configurations, the controller 204 may control the surface 202 and the surface elements 206 according to a predetermined reflection scheme that indicates how the controller is to configure the degree of reflection of the surface 202 and/or the degrees of reflection of the surface elements 206. The predetermined reflection scheme may do so by indicating to the controller 204 the degrees of reflection with which to configure each of the surface elements 206. For some example configurations, the reflection scheme may expressly or directly provide the indication, such as by expressly identifying a degree of reflection for each surface element 206. In other example configurations, the predetermined reflection scheme may implicitly or indirectly provide the indication. For example, the reflection scheme may indicate a certain degree of reflection for the surface 202, and the controller 204 may be configured to convert that certain degree to a corresponding degrees of reflection for each of the surface elements 206, such as by being configured with an algorithm or a mapping that provides a correspondence between various degrees of the surface 202 and various degrees of reflection for the individual surface elements 206. As another example, the reflection scheme may indicate a number of surface elements 206 to have the maximum degree of reflection, a number of surface elements 206 to have the minimum degree of reflection, and/or a number of surface elements 206 to have certain intermediate degrees of reflection, and based on this information, the controller 204 determines degrees of reflection for each of the surface elements 206.

In addition or alternatively, in various embodiments, a reflection scheme may indicate a pattern for the surface elements 206. As non-limiting examples, a reflection scheme may indicate that all of the surface elements 206 in a same predetermined portion, such as a same row or a same column, are to be configured with the same degree of reflection. In addition or alternatively, a pattern may indicate that adjacent rows or adjacent columns of surface elements 206 are to have different degrees of reflection—i.e., that rows or columns of surface elements are to alternate between maximum and minimum degrees of reflection. Other example patterns may indicate that adjacent surface elements 206 in the same row or the same column are to have different degrees of reflection. In particular example configurations, the pattern indicates that at least a portion of the surface elements 206 are to have maximum and minimum degrees of reflection in a checkered arrangement Various other example patterns may be possible.

In addition or alternatively, in various embodiments, a reflection scheme may have a temporal component that indicates one or more degrees of reflection for the surface 202 for one or more time periods. Based on the temporal component, the controller 204 may determine a start time and a time duration for which it to configure the surface elements 206 with certain degrees of reflection indicated by the surface scheme. In particular example configurations, a surface scheme indicates a plurality of degrees of reflection and a plurality of time periods, and associates each degree of reflection with one of the time periods. To illustrate, a surface scheme may indicate two degrees of reflection, including a high degree of reflection and a low degree of reflection, and may also indicate two time periods, including a first time period followed by a second time period. In general, the high degree of reflection has a higher degree or a higher percentage than the low degree of reflection. For example, the high degree of reflection may be the maximum degree of reflection or an intermediate degree of reflection, and the low degree of reflection may be the minimum degree of reflection or an intermediate degree of reflection. If the high degree and low degree of reflection are both intermediate degrees of reflection, then the high degree of reflection corresponds to a higher percentage than the low degree of reflection. The surface scheme may indicate to the controller 204 to configure the surface elements 206 according to the high degree of reflection during the first time period, and to configure the surface elements 206 according to the low degree of reflection during the second time period.

In addition or alternatively, in various embodiments, a temporal component of a reflection scheme may indicate a first set of time periods and a second set of time periods. The reflection scheme may indicate to configure the surface elements 206 according to the high degree of reflection during the time periods of the first set, and to configure the surface elements 206 according to the low degree of reflection during the time periods of the second set. In particular example configurations, the first and second set of time periods are interleaved between each other, causing the controller 204 to alternatingly configure the surface elements 206 with the high degree of reflection for the first time period and with the low degree of reflection for the second time period. In various configurations, the first time period may be equal to the second time period, may be longer than the second time period, or may be shorter than the second time period.

Also, reflection schemes that identify more than two degrees of reflection and/or more than two time periods or two sets of time periods may be possible. For example, a surface scheme may indicate three degrees of reflection and three or more time periods in which the controller 204 is to configure the surface elements 206 according to the three degrees of reflection.

FIGS. 3A-3F show timing diagrams of an incident signal $s_i(t)$ (FIG. 3A) and various non-limiting examples of types of reflected signals $s_r(t)$ (FIGS. 3B-3F) that the surface 202 may output based on different temporal components of a reflection scheme. For simplicity, the reflection schemes illustrated in FIGS. 4B-4F indicate two degrees of reflection, including a high degree of reflection and a low degree of reflection, according to which the controller 204 configures the surface elements 206 while reflecting the incident signal $s_i(t)$. In the figures, the power of the reflected signal $s_r(t)$ when the surface elements 206 are configured with the high degree of reflection are denoted by an associated amplitude Y1, and the power of the reflected signal $s_r(t)$ when the surface elements 206 are configured with the low degree of reflection are denoted by an associated amplitude Y2.

Figure 3A:
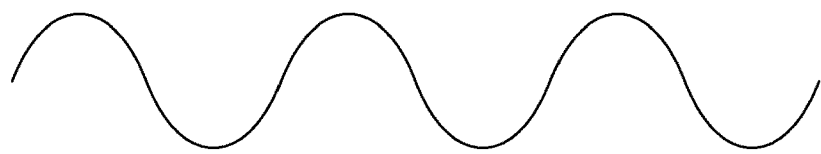
FIG. 3A shows a timing diagram of an example an incident signal.
Figure 3B:
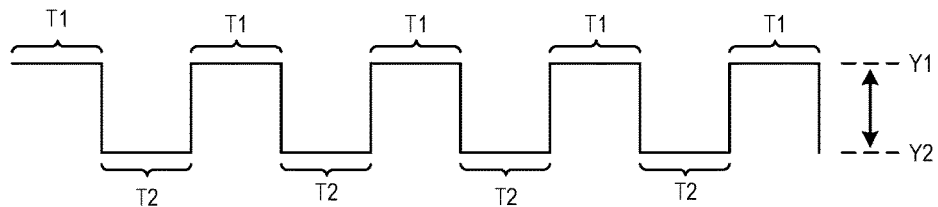
FIG. 3B shows a timing diagram of an example of a reflected signal, with a frequency greater than a frequency of the incident signal of FIG. 3A and about a 50% duty cycle.
Figure 3C:
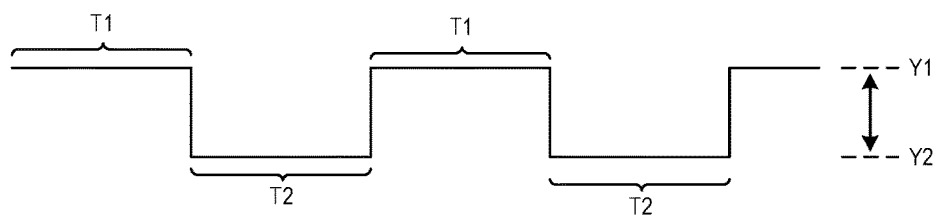
FIG. 3C shows a timing diagram of another example of a reflected signal, with a frequency less than a frequency of the incident signal of FIG. 3A and about a 50% duty cycle.
Figure 3D:
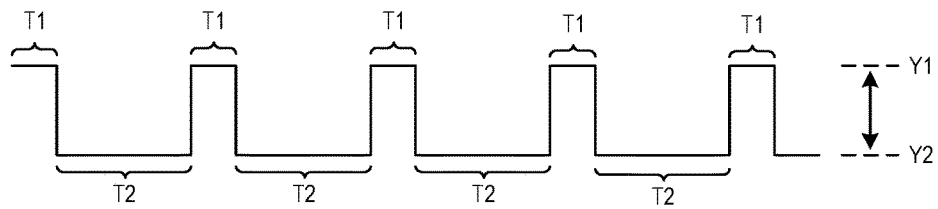
FIG. 3D shows a timing diagram of another example of a reflected signal, with a duty cycle less than 50%.
Figure 3E:
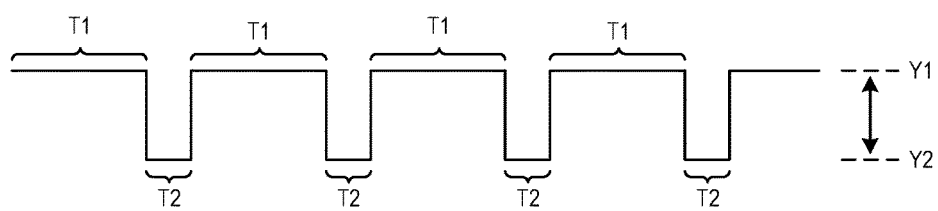
FIG. 3E shows a timing diagram of another example of a reflected signal, with a duty cycle greater than 50%.
Figure 3F:
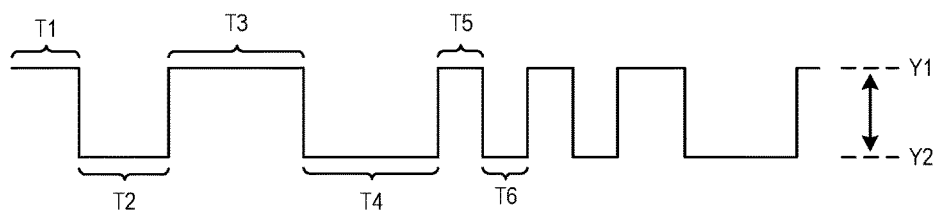
FIG. 3F shows a timing diagram of another example of a reflected signal, with a varying frequency and/or duty cycle.

Further, FIG. 3B-3E each show associated two sets of time periods T1 and T2 over which a reflected signal $s_r(t)$ propagates. The surface elements 206 reflect the incident signal $s_i(t)$ with the high degree of reflection during the first set of time periods T1, and the reflect the incident signal $s_i(t)$ with the low degree of reflection during the second set of time periods T2. With respect to FIGS. 3B and 3C, the time periods T1 and T2 are about equal to each other, resulting in a generally constant frequency and about 50% duty cycle. FIGS. 3B and 3C also show that the time periods T1 and T2 can be lengthened or shortened, resulting in different lower or higher frequencies for the reflected signal $s_r(t)$. FIG. 3D shows a temporal component of a reflection scheme indicating first time periods T1 shorter than second time periods T2, resulting in a reflected signal $s_r(t)$ with a generally constant frequency and a duty cycle less than 50%. FIG. 3E shows a temporal component of a reflection scheme indicating first time periods T1 longer than second time periods T2, resulting in a reflected signal $s_r(t)$ with a generally constant frequency and a duty cycle greater than 50%. FIG. 3F shows a temporal component of a reflection scheme indicating different durations for different time periods associated with the high and low degrees of reflection, resulting in a reflected signal $s_r(t)$ with a frequency and/or duty cycle that varies with time.

In general, a surface 202 of an intelligent reflecting device 200 is configured to output a reflected signal that has at least one corresponding characteristic that is different from that of the incident signal. In this context, the reflected signal may also be referred to as a modulated signal, in that it is has at least one characteristic that is different from that of the incident signal due to the reflection performed by the surface 202. Example characteristics include energy, power, frequency, and duty cycle. For example, when the surface 202 reflects an incident signal with one or more surface elements 206 configured with an intermediate or minimum degree of reflection, the reflected signal may have a different (i.e., lower) energy and/or power than the energy and/or power of the incident signal. As another example, depending on how the controller 204 controls the surface elements 206 according to a given reflection scheme, the surface 202 may output a reflected signal with a different frequency than the frequency of the incident signal, such as a higher frequency as depicted in FIG. 3A, or a lower frequency as a depicted in FIG. 3B. Similarly, in various embodiments where the incident signal has a duty cycle, the surface 202 may output a reflected signal with a different duty cycle (higher or lower) than the duty cycle of the incident signal, depending on the reflection scheme used by the controller 204.

Additionally, for at least some example embodiments, a surface 202 of an intelligent reflecting device 200 may be separated or divided into multiple independently controlled sections, as previously described with reference to FIG. 2C. For such embodiments, each section may be associated with a corresponding reflection scheme. For example, with respect to FIG. 2C, the controller 204 may configure the first surface portion 202(1) to reflect according to a first reflection scheme, and may configure the second surface portion 202(2) to reflect according to a second reflection scheme. The different reflection schemes may cause the different portions to output respective reflected signals with the same characteristics, or with at least one characteristic (e.g., frequency, power, or duty cycle) that is different from each other. The different characteristics may indicate or identify different portions of the intelligent reflecting device 200.

Referring back to FIG. 1, one of the communication nodes in the wireless system 100 may send a signal to another one of the communication nodes, such as in the form of a downlink signal, an uplink signal, or a sidelink signal, as previously described. The path that the signal takes from the sending device to the receiving device is referred to as a propagation path. In the event that an intelligent reflecting device 124 is in the propagation path of a signal, a surface of the intelligent reflecting device 124 may reflect the signal before it reaches the receiving device.

A receiving device (such as a user device 102 or a wireless access node 104) may be configured to detect whether a received signal was reflected by an intelligent reflecting device 124 prior to receipt. To do so, the receiving device may analyze or determine one or more characteristics of the received signal, and then determine whether the received signal was reflected by an intelligent reflecting device 124.

In various embodiments, a processor 110, 120 of the receiving device is configured to sample the received signal, such as at certain times according to clocking, in order to obtain sampled values of the received signal. Additionally, for at least some example embodiments, to detect whether a signal was reflected, the receiving device may be configured to know or identify one or more predetermined characteristics of the original signal as transmitted by the sending device and/or one or more characteristics of a signal if reflected by an intelligent reflecting device 124. Upon determining the actual characteristic(s) of the received signal, the receiving device, such as with its processor, may compare the actual characteristic(s) with the predetermined characteristic(s). The receiving device may determine whether the signal was reflected or not by an intelligent reflecting device based on whether the actual characteristic(s) match (either by exactly matching or by being within an acceptable range of) the predetermined characteristic(s).

As an example illustration, a receiving device may know a frequency of an original signal transmitted from a sending device. Upon receipt of a received signal, the receiving device may measure the frequency of the received signal. If the receiving device determines that the frequency of the received signal matches the frequency of original signal, then the receiving device may determine that the received signal was not reflected by an intelligent reflecting device 124 along the propagation path, in between being transmitted from the sending device and received by the receiving device. As another example illustration, a receiving device may know a frequency of a reflected signal reflected by an intelligent reflecting device 124. Upon receipt of a received signal, the receiving device may measure the frequency of the received signal. If the receiving device determines that the frequency of the received signal matches the frequency of the reflected signal, then the receiving device may determine that the signal was reflected by an intelligent reflecting device 124 along the propagation path, in between being transmitted from the sending device and received by the receiving device.

In addition or alternatively, for at least some example configurations, a receiving device may determine one or more characteristics of an intelligent reflecting device 124 that reflected the signal received by the receiving device. To do so, one or more characteristics of a reflected signal may indicate one or more characteristics of the intelligent reflecting device 124 that reflected the signal. That is, one or more predetermined characteristics of a reflected signal may by associated with one or more characteristics of an intelligent reflecting device 124. In turn, upon receiving a signal, the receiving device may determine one or more characteristics of the received signal, determine whether the one or more characteristics match the one or more predetermined characteristics of a reflected signal, and if they match, determine the one or more associated characteristics of the intelligent reflecting device 124 that reflected the signal before it was received by the receiving device.

An example characteristic of an intelligent reflecting device 124 is an identification (ID) of the intelligent reflecting device. Knowing the ID of the intelligent reflecting device may be particularly useful for environments including multiple intelligent reflecting devices 124 that could possibly be in a propagation path of a signal between communication nodes. Determining the ID may enable the receiving device (or the sending device or other communication nodes in the system 100) to identify which of the multiple intelligent reflecting device 124 reflected the signal. Accordingly, for at least some example configurations where a wireless system 100 includes or is in communication with a plurality of intelligent reflecting devices 124, the intelligent reflecting devices 124 may be configured to output reflect signal with different corresponding characteristics from each other, each uniquely corresponding to their own ID. To illustrate, a first intelligent reflecting device 124 may output a reflected with a first frequency indicating a first ID of the first intelligent reflecting device 124, and a second intelligent reflecting device 124 may output a reflected signal with a second frequency indicating a second ID of the second intelligent reflecting device 124. A receiving device, upon receipt of a received signal, may determine whether the frequency of the received signal matches the first frequency or the second frequency, and in turn determine whether the received signal was reflected by the first intelligent reflecting device having the first ID or the second intelligent reflecting device having the second ID.

Another example characteristic of an intelligent reflecting device 124 is a battery life. Referring back to FIG. 2A, for at least some example configurations, an intelligent reflecting device 200 may include a battery 216 configured to power the controller 204. (For other example configurations, the intelligent reflecting device 200 may powered by an external power source, such as an electrical grid.) The controller 204 may be configured to monitor the battery life (e.g., an amount of remaining charge) of the battery 216. If the controller 204 determines that the battery life has dropped below a threshold level, the controller 204 may control the surface 202, and its surface elements 206, according to a reflection scheme associated with a low battery life. Accordingly, in the event that the battery life has dropped below the threshold level, then upon receipt of an incident signal, the surface 202 will output a reflected signal according to the reflection scheme associated with the low batter life—i.e., the surface 202 will output a reflected signal with one or more characteristics that indicate the low battery life. Upon receipt of the reflected signal, the receiving deceive may identify that the one more characteristics of the received signal match one or predetermined characteristics associated with low battery life. In turn, the receiving device may generate an output that notifies a user of the receiving device of the low battery life.

Reflecting signals with one or more characteristics to indicate a battery life of an intelligent reflecting device may increase the flexibility in where intelligent reflecting devices can be positioned or located and still allow for effective operation, including places that are relatively difficult to access, such as remote locations, locations having hazardous or difficult terrain, locations subject to harsh weather conditions, or hard-to-reach locations, non-limiting examples of which may include mountains, islands, deserts, hills, jungles, underground passageways or tunnels, or hard-to-reach areas of buildings such as rooftops or walls. In turn, servicing intelligent reflecting devices in these locations can be desirably limited to only times when a service person knows with certainty, based on an actual status output from the intelligent reflecting device, that the intelligent reflecting device requires servicing. Also, positioning an intelligent reflecting device in difficult to access locations may also increase the ability for an intelligent reflecting device to increase coverage for several wireless access nodes and/or for a dynamically and/or randomly changing number of communication nodes within adequate range of the intelligent reflecting device. In this way, an intelligent reflecting device can be positioned as a stand-alone device that can flexibly or dynamically increase coverage for any of various numbers or types of wireless communication nodes, rather than as a device specifically positioned within a certain distance of a certain, static number of communication nodes (such as only one, stationary wireless access node 104) that is specifically intended to increase coverage for only those certain, static number of communication nodes.

Other characteristics of an intelligent reflecting device that can be indicated by a reflected signal may be possible, including those that may indicate a state or status of an intelligent reflecting device, and/or provide an indication that some component of the intelligent reflecting device, other than the battery, needs servicing.

Also, in at least some example configurations, a receiving device may be configured to expressly determine that it has not identified any characteristics of an intelligent reflecting device. A receiving device may make such a determination in the event that the signal it received was not reflected by any intelligent reflecting devices, or in the event that the signal was reflected by an intelligent reflecting device during a time that the surface of the intelligent reflecting device is configured with the maximum degree of reflection.

In addition, for at least some example configurations, the receiving device may be configured to take an action in response to detecting whether the received signal was reflected by an intelligent reflecting device and/or detecting one or more characteristics of an intelligent reflecting device. For at least some example configurations, the receiving device may generate and output a feedback signal that indicates the result of the detection. The feedback signal may be received by the sending device and/or one or more other communication nodes.

In addition or alternatively, for at least some example configurations, the receiving device and/or the sending device may be configured to perform an action associated with beam management. In general, in various embodiments, an antenna of a communication node (e.g., an antenna 108 of a user device 102 and/or an antenna 116 of a wireless access node 104) may include a plurality of antenna elements that may each have an associated phase and/or amplitude that can be controlled and/or adjusted, such as by an associated processor 110, 120. Through this control, a communication node may be configured to have transmit-side directivity and/or receive-side directivity, in that its processor 110, 120 can perform beam forming by selecting a beam from among a plurality of possible beams, and transmit or receive a signal with the antenna radiating the selected beam. The processor 110, 120 may be configured to use different beams or the same beams for different communications.

In order to determine which beams to select, the sending and receiving devices may perform a beam sweeping process, in which the sending device transmits signals, such as reference signals, while iterating through a plurality of transmit beams, and in which the receiving device receives signals from the sending while iterating through a plurality of receive beams. During a beam sweeping process, the receiving device may measure the energy, power, and/or signal quality (e.g., signal-to-noise ratio (SNR) or other indicators of signal quality) of each of a plurality of received signals. In doing so, the receiving device may determine which signal was received with a maximum energy or power and/or with a best signal quality, and then select a beam based on the determination. For at least some example configurations, the receiving device notifies the sending device of the energy/power/signal quality measurements, and/or of a selected receive beam.

To perform a beam sweeping process, the receiving device may need to know the number of signals to be received and/or the number of energy/power measurements the receiving device is to make. In various embodiments, that number may depend on whether the signals that the receiving device received were reflected by an intelligent reflecting device and/or which intelligent reflecting device of a plurality of intelligent reflecting devices, at least because the reflection device itself is able to change or adjust its angle of reflection, which in turn may affect the number of transmissions the sending device performs and/or the number of energy/power/signal quality measurements the receiving device performs in order to optimally select a transmit beam and/or a receiving beam. In this way, a sending device's selection of a transmit beam from a plurality of transmit beams and/or a receiving device's selection of a receive beam from a plurality of receive beams, may ultimately depend on the receiving device's determination of whether a received signal was reflected by an intelligent reflecting device and/or a determined characteristic, such as an ID, of an intelligent reflecting device.

In addition or alternatively, the sending device and/or the receiving device may control one or more intelligent reflecting devices 124 in response to, and/or depending on, the detection of whether the received signal was reflected by an intelligent reflecting device and/or the detection of one or more characteristics of an intelligent reflecting device. For example, if the receiving device detects that a received signal was reflected by an intelligent reflecting device 124, the sending device and/or the receiving device may send one or more control signals that control, adjust, and/or set a reflection angle of the intelligent reflecting device 124 that reflected the signal. In particular example configurations, in response to the receiving device detecting that a received signal was reflected by an intelligent reflecting device, the receiving device and/or the sending device may control the reflection angle of the intelligent reflecting device during and/or as part of a beam sweeping process. For example, the receiving device may measure power/signal quality of a first received signal that the intelligent reflecting device reflected at a first reflection angle, and may then measure power/signal quality of a second received signal that the intelligent reflecting device reflected at a second reflection angle. In this manner, the sending device and the receiving device may perform a beam sweeping process over a plurality of iterations, where for each iteration, the intelligent reflecting device reflects an incident signal at a certain one of a plurality of reflection angles, and the receiving device measures power/signal quality of a received signal that was reflected by the intelligent reflecting device at the certain reflection angle. Also, at the end of the beam sweeping process, the sending device and/or the receiving device may determine an optimal reflection angle for the intelligent reflecting device 124, and may control the intelligent reflecting device 124 to have the optimal reflection angle, from among the plurality of reflection angles, for subsequent communications between the sending and receiving devices. On the other hand, if the receiving devices does not detect that a received signal was reflected by an intelligent reflecting device, then the sending device and/or the receiving device may perform a beam sweeping process without controlling the reflection angle of any intelligent reflecting devices. For at least some of these embodiments, the receiving device may inform or notify the sending device of the detection of whether the signal was reflected by the intelligent reflecting device, so that the sending device can determine how and/or whether to control the intelligent reflecting device during a beam sweeping process.

In addition, for at least some example configurations, an intelligent reflecting device 124 may be controlled by one or more communication nodes (referred to as a controlling device) in the wireless system 100, such as by a wireless access node 104 or a user device 102. For example, a controlling device may control the degree of reflection of a surface 202 or associated degrees of reflection for a plurality of surface elements 206 for a given intelligent reflecting device 124. In addition or alternatively, a controlling device may control the reflection scheme(s) that an intelligent reflecting device 124 uses, and/or the times at which the intelligent reflecting device 124 uses certain reflection scheme(s). In addition or alternatively, a controlling device may control, such as by setting or adjusting, a reflection angle of an intelligent reflecting device 124, such as part of a beam sweeping process, as previously described.

Additionally, for at least some example systems 100, a controlling device may be configured to control multiple intelligent reflecting devices 124. For some examples, a controlling device controls multiple reflecting devices 124 by scheduling transmissions of signals to be reflected by different intelligent reflecting devices 124 during different, non-overlapping time periods. In contrast, if different intelligent reflecting devices 124 reflected respective signals during a common time period, it is possible that the reflected signals could combine before being received by respective receiving devices. The combined signal may have characteristics (frequency, duty cycle, power, etc.) different from characteristics of the individual reflected signals, such that upon receipt, the receiving devices may be unable to detect whether the received signal was reflected by an intelligent reflecting device, and/or one or more characteristics (e.g., an ID) of an intelligent reflecting device that reflected the received signal. Accordingly, scheduling the transmissions of signals reflected by different intelligent reflecting devices 124 in different time slots may avoid undesirably combining such signals. As such, in response to the scheduling, one or more sending devices may transmit a first set of one or more signals to be reflected by a first intelligent reflecting device 124 during a first time period, and may transmit a second set of one or more signals to be reflected by a second intelligent reflecting device 124 during a second time period. The second time period does not overlap with the first time period, and may be sufficiently delayed from an end of the first time period for at least some embodiments, so that one or more reflected signals that were reflected by the first intelligent reflecting device 124 are not combined with, or otherwise interfered by, any reflected signals reflected by the second intelligent reflecting device 124. This way, one or more receiving devices receiving the reflected signals reflected by the first intelligent reflecting device can determine that the signals were reflected and/or one or more characteristics of the first intelligent reflecting device.

Figure 4A:
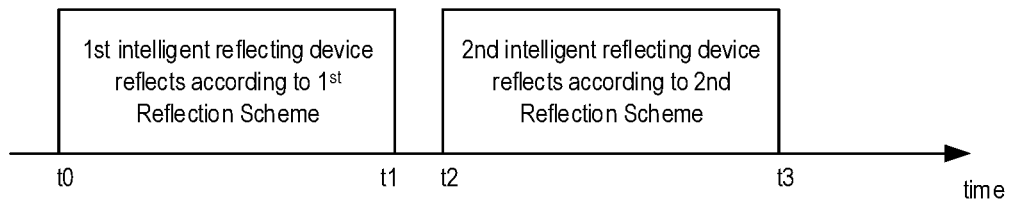
FIG. 4A shows a timing diagram of multiple intelligent reflecting devices reflecting according to respective reflection schemes in non-overlapping time periods.

FIG. 4A illustrates an example of two intelligent reflecting devices reflecting according to respective reflection scheme in different, non-overlapping time periods, such as through control of a controlling device. For example, as indicated in FIG. 4, a first intelligent reflecting device reflects one or more signals according to a first reflection scheme during a first time period extending from a first time t0 to a second time t1. In addition, a second intelligent reflecting device reflects signals according to a second reflection scheme during a second time period extending from a third time t2 to a fourth time t3.

As shown in FIG. 4, the first and second time periods are non-overlapping. Also, for at least some example configurations, such as the one shown in FIG. 4, a predetermined amount of time may extend between time periods. For example, as shown in FIG. 4, a certain, predetermined amount of time may extend between the second time t1 and the third time t2 to prevent against unwanted combining. For other example configurations, one time period may begin at the same time another period ends (e.g., t1 and t2 would be the same in FIG. 4).

Other ways that a communication node may control an intelligent reflecting device 124 may be possible. Additionally, in general, to control an intelligent reflecting device 124, the controlling device may send one or more control signals to the intelligent reflecting device 124, which the controller 204 of the intelligent reflecting device 200 may receive. In various embodiments, the controller 204 of the intelligent reflecting device 200 may be configured to receive the control signals though a wired connection with the controlling device, wirelessly (such as through an antenna 214), or combinations thereof.

In addition, for other example configurations, an intelligent reflecting device 124 is self-controlled, in that the controller 204 determines reflection schemes or otherwise controls its surface 202, the surface elements 206, and/or reflection angles, without being controlled by an external device. For example, the memory 210 of the intelligent reflecting device 200 may be pre-configured with one or more reflection schemes, and the controller 204 is otherwise pre-configured with the ability to control the surface 202 and the surface elements 206 upon manufacture of the intelligent reflecting device, or least before operation, and the controller 204 may exclusively rely on the pre-configuration during its life or period of operation. In various configurations, a self-controlled (or standalone) intelligent reflection device may be configured in difficult-to-access locations, such as the ones previously described. In addition or alternatively, a self-controlled intelligent reflecting device may be configured such that it is not designated for operation with any one particular communication node (e.g., any particular base station), but instead improves coverage for any of various communication nodes that move within a predetermined distance or vicinity of the intelligent reflecting device at various points in time. An intelligent reflecting device configured to output a reflected signal with a characteristic indicating a battery life may be particularly useful for such self-controlled intelligent reflecting devices.

Additionally, for some embodiments, a propagation path between a sending device and a receiving device may include only a single intelligent reflecting device 124, such that a signal communicated over the propagation path is reflected by the single intelligent reflecting device 124, before being received by the receiving device. For other embodiments, a propagation path includes multiple intelligent reflecting devices 124, such that a signal communicated over the propagation path may be reflected by each of the multiple intelligent reflecting devices 124 before received by the receiving device. For example, where a propagation path includes N intelligent reflecting devices 124 (where N is two or more), a signal may be reflected N times by surfaces of the N intelligent reflecting devices 124 before being received by a receiving device. For particular example configurations, each of the multiple intelligent reflecting devices may have a surface that reflects a respective incident signal according to an associated reflection scheme, such that the characteristics of the received signal may be based on, or correspond to, a combination of the multiple reflection schemes.

As with configurations that include only a single intelligent reflecting device in a propagation path, a receiving device receiving a signal that was reflected multiple times by multiple intelligent reflecting devices may have one or more characteristics that are detected by the receiving device. The receiving device may then determine whether the one or more detected characteristics matches one or more predetermined characteristics. If so, the receiving device may determine that the received signal was reflected by at least one intelligent reflecting device, and/or one or more characteristics (e.g., ID or battery life) of at least one of the multiple intelligent reflecting devices that reflected the signal.

Figure 4B:
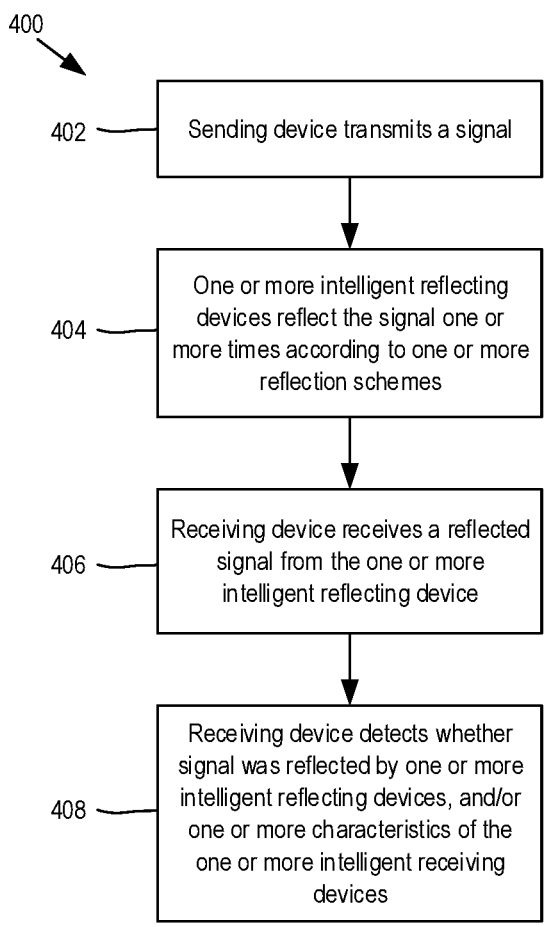
FIG. 4B shows a flow chart of an example method of transmitting a signal over a propagation path that includes one or more intelligent reflecting devices.

FIG. 4B shows a flow chart of an example method 400 of transmitting a signal over a propagation path that includes one or more intelligent reflecting devices. At block 402, the sending device transmits the signal toward a receiving device. At block 404, one or more intelligent reflecting devices reflects the signal one or more times according to one or more reflection schemes. At block 406, the receiving device receives a reflected signal from the one or more intelligent reflecting devices. If the one or more intelligent reflecting devices includes multiple intelligent reflecting devices, then the receiving device may receive the reflected signal from a last intelligent reflecting device that last reflected the signal. At block 406, the receiving device may detect whether the received signal was reflected by an intelligent reflecting device, and/or one or more characteristics of the one or more intelligent reflecting devices that reflected the signal, such as by detecting one or characteristics of the received signal, as previously described. Based on the detection, the receiving device may take one or more actions, as previously described.

Figure 5:
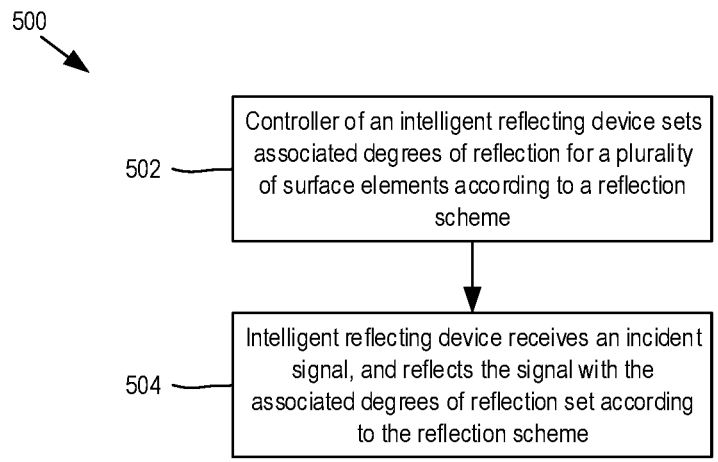
FIG. 5 shows a flow chart of an example method of operating an intelligent reflecting device.

FIG. 5 shows a flow chart of an example method 500 of operating an intelligent reflecting device (e.g., intelligent reflecting device 124 or 200) for wireless communication. At block 502, a controller (e.g., the controller 204) may set associated degrees of reflection for a plurality of surface elements of a surface of the intelligent reflecting device according to a reflection scheme. As previously described, each associated degree of reflection may be an associated maximum degree of reflection, an associated minimum degree of reflection, or an associated intermediate degree of reflection. The reflection scheme may indicate to the controller the associated degree of reflection for each of the surface elements.

At block 504, the surface of the intelligent reflecting device may receive an incident signal and reflect the incident signal with the associated degrees of reflection of the plurality of surface elements set according to the reflection scheme. As previously described, the reflected signal may have at least one characteristic that is different than a corresponding characteristic of the incident signal, such as a different frequency, power, energy, and/or duty cycle. Additionally, for at least some embodiments, the characteristic may indicate one or more characteristics of the intelligent reflecting device, such as an identification or a battery life of the intelligent reflecting device.

In various example embodiments, the incident signal that the intelligent reflecting device reflects is or includes a downlink signal, such as one that a wireless access node 104 generates and transmits to a user device 102. In other example embodiments, the incident signal is or includes an uplink signal, such as one that a user device 102 generates and transmits to a wireless access node 104. In still other example embodiments, the incident signal is or includes a sidelink signal, such as one that a first user device 102 generates and transmits to a second user device 102, or one that a first wireless access node 104 generates and transmits to a second wireless access node 104.

Figure 6:
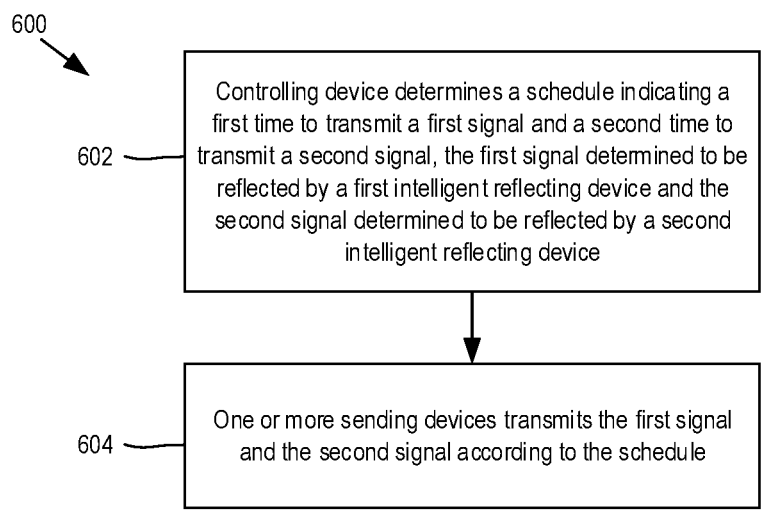
FIG. 6 shows a flow chart of an example method of operating a plurality of intelligent reflecting devices.

FIG. 6 shows a flow chart of an example method 600 of operating a plurality of intelligent reflecting devices for wireless communication. At block 602, a controlling device may determine a schedule that indicates a first time to transmit a first signal and a second time to transmit a second signal. In various embodiments, the first and second signals may be downlink signals, uplink signals, or sidelink signals. In addition, the controlling device may determine that the first signal and the second signal are to be reflected by different intelligent reflecting devices, such as in different propagation paths, before receipt by one or more receiving devices. Also, in various embodiments, the controlling device may determine the second time, and include the second time in the schedule, before the first signal is transmitted. In other embodiments, the controlling device may determine the second time, and include the second time in the schedule, after the first signal is transmitted.

At block 604, one or more sending devices transmits the first signal and the second signal according to the schedule (e.g., at the first time and the second time, respectively). In various embodiments, the sending device and the controlling device may be the same device, or may be different devices. In the event that they are different devices, then the controlling device may send the schedule to the sending device. After the transmissions, the first intelligent reflecting device may reflect the first signal according to a first reflection scheme to output a first reflected signal, and the second intelligent reflecting device may reflect the second signal according to a second reflection scheme to output a second reflected signal. In turn, one or more receiving devices may receive the first reflected signal and the second reflected signal.

In addition, at block 602, the controlling device may determine the second time at which to send the second signal sufficiently after the first time such that the one or more receiving devices receive the first reflected signal and the second reflected signal without being combined or interfered by each other. This way, the one or more receiving may successfully detect the characteristics of the first reflected signal that indicate that the first reflected signal was reflected by the first intelligent reflecting device and/or the associated characteristics of the first intelligent reflecting device, and detect that the second reflected signal was reflected by the second intelligent reflecting device and/or the associated characteristics of the second intelligent reflecting device.

Figure 7:
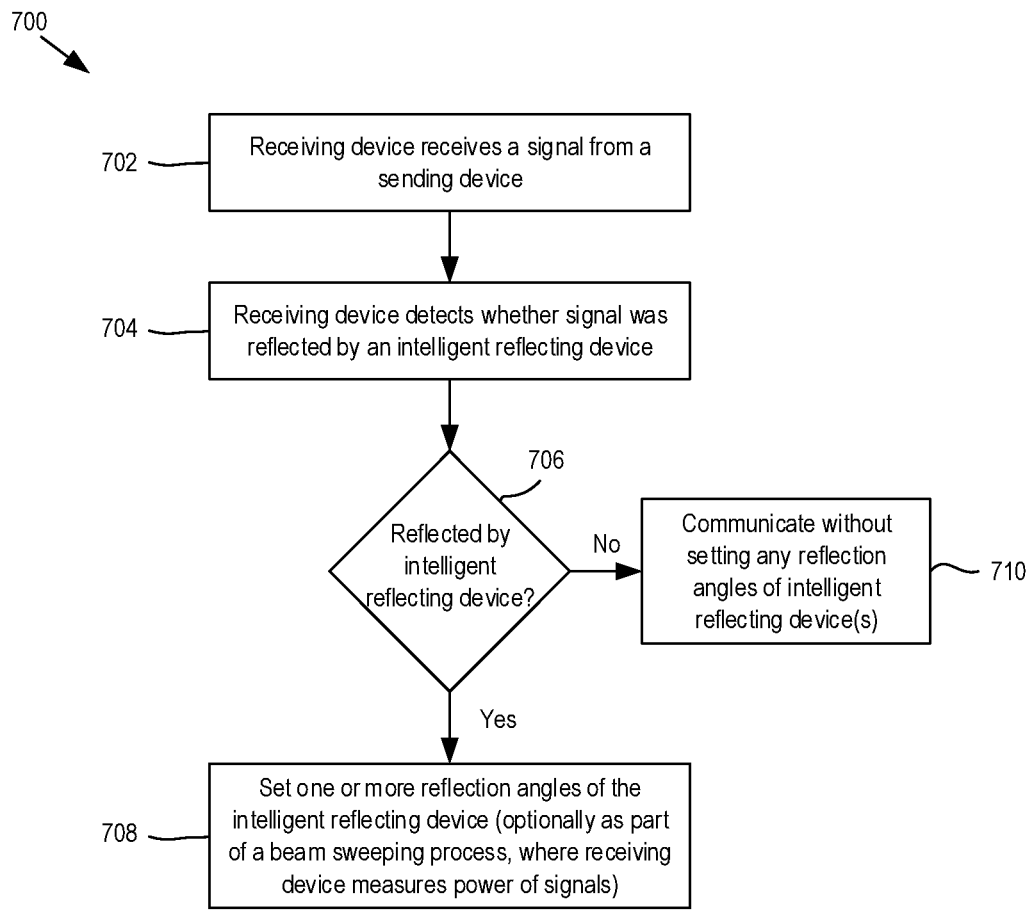
FIG. 7 shows a flow chart of an example method of configuring an intelligent reflecting device.

FIG. 7 shows a flow chart of example method 700 of configuring an intelligent reflecting device for wireless communication. At block 702, a receiving device may receive a signal from a sending device. In various embodiments, the receiving device may be a user device and the sending device may be a wireless access node. In other embodiments, the receiving device may be a wireless access node and the sending device may be a user device. In still other embodiments, the sending device and the receiving device may both be user devices. In yet other embodiments, the sending device and the receiving device may both be wireless access nodes.

At block 704, the receiving device may detect whether the signal was reflected by an intelligent reflecting device. For at least some embodiments, the receiving device may do so by detecting at least one characteristic of the received signal, such as a frequency, duty cycle, power, or energy, of the signal, and compare the detected characteristic with a predetermined characteristic associated with a signal reflected by an intelligent reflecting device. If the detected and predetermined characteristics match, then the receiving device may determine that the received signal was reflected by an intelligent reflecting device. Alternatively, if the detected and predetermined characteristics do not match, then the receiving device may determine that the received signal was not reflected by an intelligent reflecting device.

At block 706, if the receiving device detects that the signal was reflected by an intelligent reflecting device, then at block 708, a controlling device may set one or more reflection angles of the intelligent reflecting device. In various embodiments, the controlling device may be the receiving device, the sending device, or another communication node. Additionally, for at least some embodiments, the controlling device may control the intelligent reflecting device to set one or more reflection angles as part of a beam sweeping process, as previously described. During the beam sweeping process, the sending and receiving devices may sweep through a plurality of iterations, where for each iteration, the controlling device sets a reflection angle, and the receiving device measures a power of a signal reflected by the intelligent reflecting device at the set reflection angle. Additionally, for at least some example embodiments, based on the measurements, the sending device and/or the receiving device may determine an optimal reflection angle for the intelligent reflecting device, and the controlling device may set the reflection angle of the intelligent reflecting device to the optimal reflection angle for subsequent communication between the sending and receiving devices.

Referring back to block 706, if the receiving device detects that the signal was not reflected by an intelligent reflecting device, then at block 710, the sending device and the receiving device may further communicate without setting any reflection angles of the intelligent reflecting device. For example, the sending and receiving devices may perform a beam sweeping process, or communicate other signals between each other, without setting any reflection angles, or otherwise controlling an intelligent reflecting device.

Additionally, for at least some example embodiments, upon detecting whether the signal was reflected by an intelligent reflecting device at block 704, the receiving device may output a feedback signal that indicates whether it detected that an intelligent reflecting device reflected the signal. For at least some of these embodiments, the receiving device is not configured as the controlling device, and so the receiving device outputs the feedback signal to another device, such as the controlling device, the sending device, or another communication node. In at least some embodiments, the controlling device and the second device are the same device. As such, the feedback signal indicates to the controlling device that receives the feedback signal whether and/or how to control an intelligent reflecting device. Accordingly, if the feedback signal indicates that reflection by an intelligent reflection device occurred, then the feedback signal indicates that control of the intelligent reflecting device is to occur. On the other hand, if the feedback signal indicates that reflection by an intelligent reflecting device did not occur, then the feedback indicates that control of the intelligent reflecting device is not to occur. Accordingly, in response to receipt of the feedback signal, the controlling device may determine whether to set any reflection angles of an intelligent reflecting device based on the indication of the feedback signal. For example, if the feedback signal indicates that the receiving device detected that the received signal was reflected by an intelligent reflecting device, then, based on the feedback signal, the controlling device may control the intelligent reflecting device by setting one or more reflection angles of the intelligent reflecting device, such as during a beam sweeping process. On the other hand, if the feedback signal indicates that the receiving device did not detect that the received signal was reflected by an intelligent reflecting device, then, based on the feedback signal, the controlling device may determine not to set a reflection angle for any intelligent reflection devices. For at least some of these embodiments, the receiving device is a user device, and the controlling device is the sending device, which, at least in some embodiments, is a wireless access node.

In addition or alternatively, for at least some example embodiments, the receiving device may select a beam from a plurality of beams, with which to communicate with the sending device based on detecting that the signal was reflected by an intelligent reflecting device. For example, in response to the detection, the receiving device may select a beam based on identifying which intelligent reflecting device reflected the received signal (such as by identifying an ID of the intelligent reflecting device) and/or by selecting a beam corresponding to a reflection angle, such as an optimal reflection angle, at which the intelligent reflection device is controlled to have.

Figure 8:
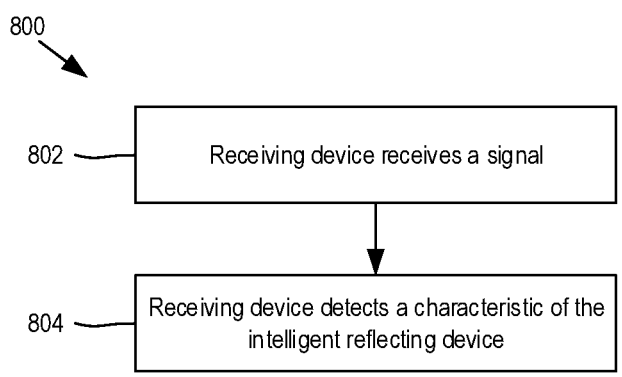
FIG. 8 shows a flow chart of an example method of detecting a characteristic of an intelligent reflecting device.

FIG. 8 is a flow chart of an example method 800 of detecting a characteristic of an intelligent reflecting device. At block 802, a receiving device may receive a signal. At block 804, the receiving device may detect a characteristic of an intelligent reflecting device that reflected the signal. For example, the receiving device may detect a characteristic of the received signal, and in turn, determine that the characteristic matches, or otherwise corresponds to, a characteristic of the intelligent reflecting device that reflected the signal, such as an ID or a battery life of the intelligent reflecting device.

Other methods may be possible, including those that combine any of various blocks from the example methods 400, 500, 600, 700, 800.

The description and accompanying drawings above provide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

The invention claimed is:

1. A method comprising:
   setting associated degrees of reflection for a plurality of surface elements of a surface of an intelligent reflecting device according to a reflection scheme, wherein the surface is configured to reflect with one or more reflection angles;
   with the surface, reflecting an incident signal with the associated degrees of reflection for the plurality of surface elements set according to the reflection scheme; and
   outputting, with the surface, a reflected signal in response to reflecting the incident signal, the incident signal and the reflected signal comprising respective corresponding characteristics that are different from each other,
   wherein the respective corresponding characteristics each comprises a frequency, a power, or a duty cycle.

2. The method of claim 1, wherein the incident signal comprises a downlink signal.

3. The method of claim 1, wherein the incident signal comprises an uplink signal.

4. The method of claim 1, wherein the incident signal comprises a sidelink signal.

5. The method of claim 1, wherein the intelligent reflecting device comprises a first intelligent reflecting device, the surface comprising a first surface, the plurality of surface elements comprising a first plurality of surface elements, the reflection scheme comprising a first reflection scheme, and the incident signal comprising a first incident signal, wherein the method further comprises:
reflecting, with a second surface of a second intelligent reflecting device, a second incident signal with associated degrees of reflection for a second plurality of surface elements of the second surface set according to a second reflection scheme.

6. The method of claim 5, wherein reflecting the first incident signal comprises reflecting the first incident signal with the first surface during a first time period, and wherein reflecting the second incident signal comprises reflecting the second incident signal with the second surface during a second time period.

7. The method of claim 1, wherein the respective corresponding characteristics indicate at least one characteristic of the intelligent reflecting device.

8. The method of claim 7, wherein the at least one characteristic of the intelligent reflecting device indicates at least one of an identification of the intelligent reflecting device or a battery life of the intelligent reflecting device.

9. The method of claim 1, wherein the intelligent reflecting device comprises a first intelligent reflecting device, the surface comprising a first surface, the plurality of surface elements comprising a first plurality of surface elements, the reflection scheme comprising a first reflection scheme, and the incident signal comprising a first incident signal, wherein the method further comprises:
reflecting, with a second surface of a second intelligent reflecting device, a reflected signal with associated degrees of reflection for a second plurality of surface elements of the second surface set according to a second reflection scheme, the reflected signal reflected by the first surface of the first intelligent reflecting device.

10. The method of claim 1, wherein the surface comprises a first portion and a second portion, the plurality of surface elements comprising a first plurality of surface elements that are part of the first portion, the reflection scheme comprising a first reflection scheme, the incident signal comprising a first incident signal, and wherein the method further comprises:
reflecting, with the second portion comprising a second plurality of surface elements, a second incident signal with associated degrees of reflection for the second plurality of surface elements set according to a second reflection scheme.

11. A system comprising:
an intelligent reflecting device comprising:
a surface comprising a plurality of surface elements; and
a controller configured to set associated degrees of reflection of the plurality of surface elements according to a reflection scheme,
wherein the surface is configured to:
reflect an incident signal with the associated degrees of reflection for the plurality of surface elements according to the reflection scheme; and
output a reflected signal in response to reflecting the incident signal, the incident signal and the reflected signal comprising respective corresponding characteristics that are different from each other,
wherein the respective corresponding characteristics each comprises a frequency, a power, or a duty cycle.

12. The system of claim 11, wherein the incident signal comprises a downlink signal, an uplink signal, or a sidelink signal.

13. The system of claim 11, wherein the intelligent reflecting device comprises a first intelligent reflecting device, the surface comprising a first surface, the plurality of surface elements comprising a first plurality of surface elements, the reflection scheme comprising a first reflection scheme, and the incident signal comprising a first incident signal, the system further comprising:
a second intelligent reflecting device comprising a second surface comprising a second plurality of surface elements, the second surface configured to reflect a second incident signal with associated degrees of reflection for the second plurality of surface elements according to a second reflection scheme.

14. The system of claim 13, wherein the first surface is configured to reflect the first incident signal during a first time period, and the second surface is configured to reflect the second incident signal during a second time period.

15. The system of claim 11, wherein the respective corresponding characteristics indicate at least one characteristic of the intelligent reflecting device, wherein the at least one characteristic of the intelligent reflecting device indicates at least one of an identification of the intelligent reflecting device or a battery life of the intelligent reflecting device.

16. The system of claim 11, wherein the intelligent reflecting device comprises a first intelligent reflecting device, the surface comprises a first surface, the plurality of surface elements comprises a first plurality of surface elements, the reflection scheme comprises a first reflection scheme, and the incident signal comprises a first incident signal, wherein the system further comprises:
a second intelligent reflecting device comprising a second surface comprising a second plurality of surface elements, the second surface configured to:
receive a reflected signal that is reflected by the first surface of the first intelligent reflecting device; and
reflect the reflected signal with associated degrees of reflection for the second plurality of surface elements.

17. The system of claim 11, wherein the surface comprises a first portion and a second portion, the plurality of surface elements comprising a first plurality of surface elements that are part of the first portion and a second plurality of surface elements that are part of the second portion, the reflection scheme comprising a first reflection scheme, the incident signal comprising a first incident signal, and
wherein the second portion is configured to reflect a second incident signal with associated degrees of reflection for the second plurality of surface elements set according to a second reflection scheme.

* * * * *